July 3, 1951 W. S. ALDRICH 2,558,999
PROJECTION APPARATUS FOR POSITIVE
AND NEGATIVE IMAGE PAIRS
Filed Aug. 17, 1948
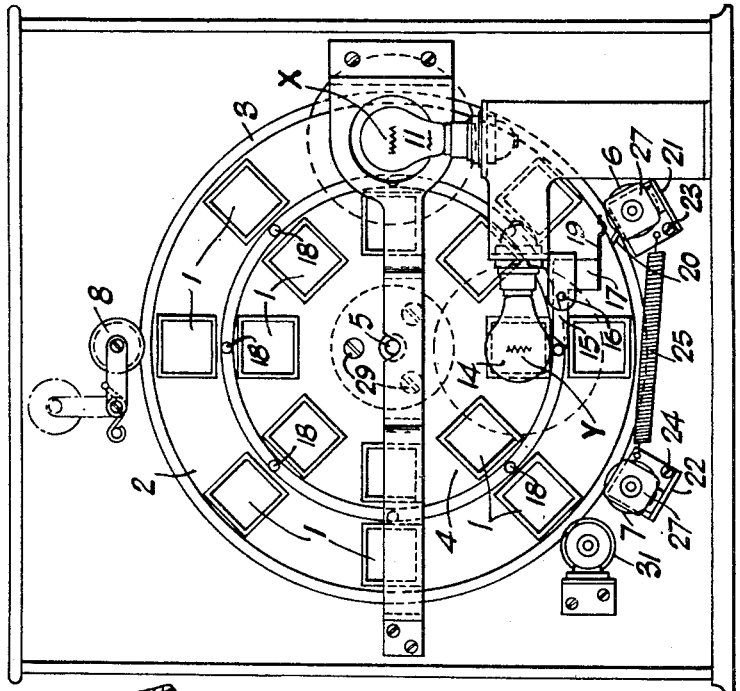
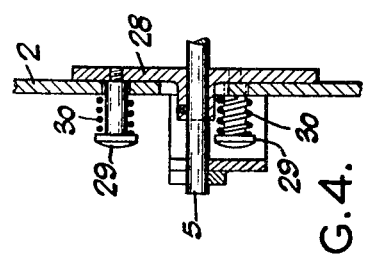
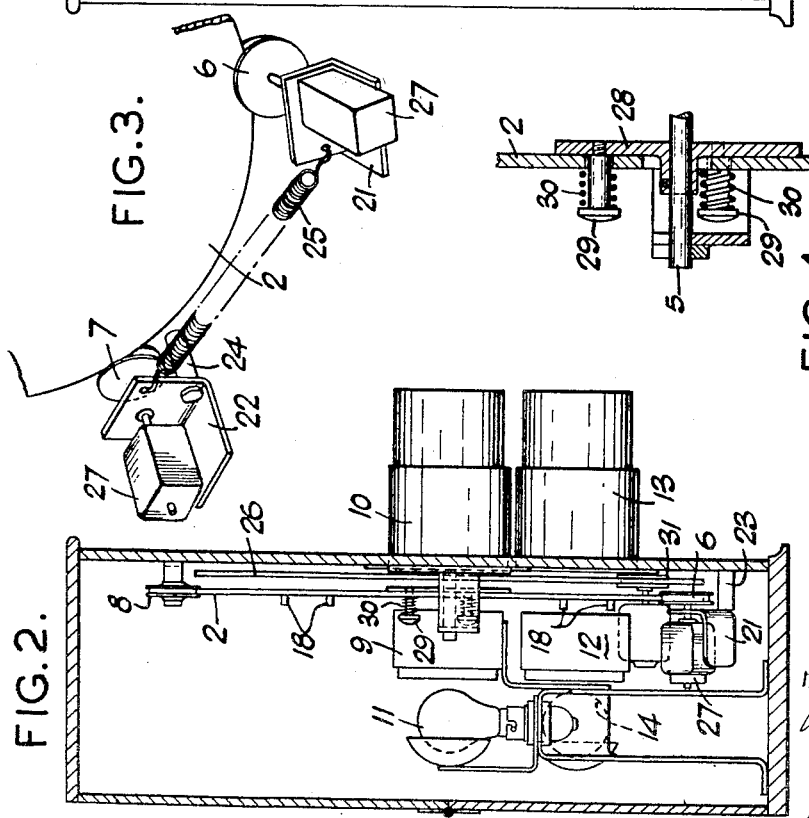
INVENTORS.
W. S. Aldrich
BY Baldwin, Wight, &
Prevost ATTORNEYS Patented July 3, 1951

2,558,999

UNITED STATES PATENT OFFICE 2,558,999

PROJECTION APPARATUS FOR POSITIVE AND NEGATIVE IMAGE PAIRS

William Stanley Aldrich, Chaldon, near Caterham, England, assignor to Stilwell Darby & Company Limited, London, England Application August 17, 1948, Serial No. 44,702
In Great Britain August 25, 1947

3 Claims. (Cl. 88—27)

This invention relates to apparatus for use in display by optical projection as is required for example in the display of advertisements and other matter on theater and other screens.

The main object of this invention is to produce a novel display effect by which interest in the display will be increased.

The present invention consists in means for moving on a screen in intersecting paths a positive and a negative image of the subject for display and in temporarily bringing the images to rest at the time when (at the point of intersection) they coalesce, but slightly out of register, so that the two images move across the screen and then appear suddenly to stand out in relief and a novel effect thus produced to heighten the interest in the matter displayed.

It may be desired to increase the relief or stereoscopic effect by arranging one image to be slightly out of focus with respect to the other.

The intensity of illumination of the two images can have different (and variable) values and the images can be projected through moving colour screens to accentuate the stereoscopic effect.

Apparatus to carry the method into effect can take different forms: the positive and negative of the subject would generally be on transparent slides or films, the arrangement of which would depend on the disposition of the projection apparatus.

A particularly attractive effect is obtained for display purposes such as for projecting advertisements on to a screen by arranging the two projection systems at substantial angular separation (e. g. 90°) about the axis of rotation of a rotatable carrier on which slides are disposed in providing a stop mechanism which will automatically bring the carrier to rest for a predetermined period when the related slides move into optical register with their respective projector: with such an arrangement the two images move towards one another on the screen and stop at the moment when they coalesce, and then after the time interval commence to move away from one another while the next related pair of images move towards register and so on.

One such apparatus is shown in the accompanying drawing in which Figure 1 is a front elevation Fig. 2 a side sectional elevation, Fig. 3 a detail elevation and Fig. 4 a detailed sectional elevation.

The apparatus shown in the drawing is designed for use when the positives and negatives or any one subject are formed on separate slides which are indicated by the reference 1. To support the slides there is employed a disc 2 of transparent or opaque material which is arranged to enable the slides to be disposed in two annular rows 3, 4 disposed about the axis of the disc which is itself supported by a central spindle 5. The disc is driven at its periphery by driving pulleys 6, 7 and is steadied by those pulleys and by a further pulley 8.

In register with the annulus 3 is an optical system comprising a condenser lens 9 and a projection lens 10 which is adjustable for focussing, a light source such as the lamp 11 being associated with that system. A second similar optical system comprising a condenser lens 12, an adjustable projection lens 13 and a light source 14 is associated with the annulus 4. As is most clearly seen in Fig. 1, the two optical systems are angularly spaced about the axis of the disc 2, the angular separation in the particular arrangement shown in the drawing being 90°.

The two optical systems are set so as to project images in or slightly out of register on a screen (not shown) and the slides 1 are so disposed that a slide in each of the annuli 3, 4 comes into register at the same time with each optical system.

The slides which are produced in pairs for any one subject, one being a positive and the other a negative, are set up on the disc so that when one slide of a pair registers with one optical system, the other slide of the other pair registers with the other optical system: with the parts as shown in Fig. 1 the slide at position X (where it is in register with the lens 10) is say the positive of the subject on the slide at position Y where this latter slide registers with the projection lens 13, this latter slide being the negative of the same subject.

The two projection lenses 10 and 13 are adjusted to produce on the screen the positive and negative images slightly out of register: thus, coupled with the fact that the two projectors 10, 13 are angularly separated has the result that while the disc 2 is rotated the two images of the two paired slides move in different intersecting paths across the screen and at the precise moment that the images substantially coalesce the combined image appears to stand out due to the stereoscopic effect caused by the superimposition of a positive and a negative image in slightly different register on the screen. If desired one image can be slightly out of focus and this tends to increase the effect.

It is clear from the drawings that a series of paired slides 1 is mounted on the disc 2 so that a series of subjects would be presented in succession as the disc rotates.

To heighten the effect of the sudden production of a stereoscopic image, mechanism is provided to bring the disc 2 momentarily to rest at the moment that the two paired images coalesce: this can be achieved as seen most clearly in Fig. 1 in which there is shown a detent in the form of a lever 15 pivoted at 16 and having a weighted part 17 disposed to hold the end of the lever in the path of pins 18 mounted on the disc 2 one pin being provided for each slide position. The lever has an extension 19 which is disposed to be engaged by a pin 20 on the pulley 6. The parts are so disposed that (assuming the disc 2 to be rotating) a pin 18 on the disc comes against the end of the lever at the precise moment that the two paired images on the screen merge into one another and this arrests the disc, the pulleys 6, 7 continuing to rotate by slipping past the disc: this arresting of the disc continues until the pin 20 on the pulley 6 comes into engagement with the extension 19 whereupon the lever is rocked to move its end clear of the pin 18 and drive by the pulleys 6, 7 is again resumed until the next pin 18 moves into position and so on.

It being essential that the pulley 6 on which the release pin 20 is mounted shall not stop rotation, it is arranged that the two pulleys shall be mounted on frames 21, 22 respectively which are pivoted at 23, 24, the two frames being drawn towards one another by a spring 25 which sets up the necessary total urge of the pulleys against the disc 2. The point of application of the spring to the frame 21 has however a smaller or less leverage than the point of application to the frame 22 so that the disc 6 takes a smaller part of the driving pressure and any tendency to stop the pulleys would be taken by the pulley 7 and not by the pulley 6.

It is preferred to provide a second disc or ring 26 which has a varicoloured annulus or annuli to pass across one or other of the two optical projecting systems and to provide on the screen a constantly moving back-ground. This disc 26 is supported freely on the spindle 5 and is driven and steadied at its periphery by pulleys corresponding to the pulleys 6, 7 and 8 one of these pulleys indicated at 31 being constantly driven to drive the disc 26 without interruption.

The pulleys 6 and 7 for driving the disc 2 are preferably driven each by a small electric motor, the motors being indicated at 27: the driven pulley for the disc 26 would be similarly driven.

To enable the centre-mounted disc 2 to accommodate itself on the spindle 5 for peripheral variation at its engagement with the pulleys 6, 7, 8, the spindle 5 is formed with a flange 28 as seen in Fig. 4 having a number of driving pins 29 to pass into openings at the centre of the disc 2, and springs 30 react between the pins and the disc to permit the disc to float.

It will be clear that although for most purposes it is preferable to employ a single projection apparatus such as is shown in the drawing, it would be possible to carry the method of this invention into effect by using two projection apparatus, one for the positive and the other for the negative and to synchronize the two apparatus.

What I claim is:

1. Display apparatus comprising an image carrier, pulleys supporting the carrier for rotation, a pair of optical projectors to be trained on to the same zone on a screen, the said projectors being angularly separated about the axis of rotation of the carrier, image supports mounted in pairs on the carrier, each pair consisting of a positive and a negative of the subject for display and the images of each pair being simultaneously moved by rotation of the carrier respectively across the two projectors, means continuously driving two of the supporting pulleys to rotate the carrier, a series of stops on the carrier, a stop-engaging component to engage the stops successively to bring the carrier to rest when the related pairs of projected images coalesce with slight lack of register, a trip component on one of the constantly driven pulleys, the said trip component releasing the stop-engaging component to free the carrier for continual movement, and spring means urging the two pulleys into engagement with the carrier with a force which is smaller for the pulley with the trip component than for the other driven pulley.

2. Display apparatus comprising an image carrier in the form of a disc, means supporting the carrier for rotation, a pair of optical projectors to be trained to the same zone on a screen, the said projectors being angularly separated about the axis of rotation of the carrier, image supports mounted in pairs on the carrier, each pair consisting of a positive and a negative of the subject for display, the images of each pair being simultaneously movable by rotation of the carrier respectively across the two optical projectors, means to rotate the carrier, means to bring the carrier to rest temporarily at a time when the related pairs of projected images coalesce with slight lack of registry including two constantly driven pulleys, engaging the periphery of said carrier disc, said pulleys being spaced angularly about the disc, stops on said disc, a stop component to engage said stops in succession to hold said disc against rotation, a trip component movable with one driven pulley to engage and release the stop component, and means spring urging the two pulleys into engagement with the disc with a force which is less for the said one pulley than for the other pulley.

3. Display apparatus comprising an image carrier, means supporting the carrier for rotation, a pair of optical projectors to be trained to the same zone on a screen, image supports mounted in pairs on the carrier, each pair consisting of a positive and a negative of the subject for display, said image supports being arranged in an inner and an outer circular path concentric with the axis of rotation of the carrier, said projectors being angularly separated about said axis of rotation and associated one projector with the image supports in the outer circular path and the other projector with the image supports in the inner circular path, the images of each pair being simultaneously movable by rotation of the carrier respectively across the two optical projectors, means to rotate the carrier, and means to bring the carrier to rest temporarily at a time when the related pairs of projected images coalesce with slight lack of register.

W. STANLEY ALDRICH.

REFERENCES CITED

The following references are of record in the file of this patent:

UNITED STATES PATENTS

| Number | Name | Date |
|--------|------|------|
| 1,258,712 | Shaw | Mar. 12, 1918 |
| 1,282,829 | Mejia | Oct. 29, 1918 |

FOREIGN PATENTS

| Number | Country | Date |
|--------|---------|------|
| 429,656 | France | July 24, 1911 |
| 538,059 | Great Britain | July 18, 1941 |